Patented Oct. 10, 1950

2,525,714

UNITED STATES PATENT OFFICE 2,525,714

PREPARATION OF 2,4,6-TRISTRICHLOROMETHYL-1,3,5-TRIAZINE

Ted R. Norton, Pittsburg, Calif., assignor to The Dow Chemical Company, Midland, Mich., a corporation of Delaware No Drawing. Application May 1, 1948, Serial No. 24,688

4 Claims. (Cl. 260—248)

This invention relates to improvements in the preparation of 2,4,6-tristrichloromethyl-1,3,5-triazine, having the formula:

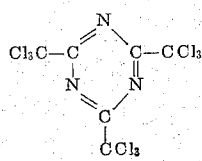

The compound is the trimer of trichloroacetonitrile, as indicated by the alternative formula, $(CCl_3CN)_3$. Trichloroacetonitrile may be prepared by chlorinating acetonitrile according to known methods. The trimer is useful for the preparation of fluorinated derivatives, since its side-chain chlorine atoms can be replaced by fluorine atoms by means of fluorinating agents, whereas the simple nitrile, $CCl_3CN$, cannot be successfully fluorinated by known methods.

The trimerization of trichloroacetonitrile has heretofore been effected by contact with anhydrous halogen acids, such as HCl or HBr. In contrast to aromatic nitriles, which are readily trimerized, the reaction with trichloroacetonitrile is extremely slow, the time required for completion being on the order of about 100 hours. I have now found that the addition of a small amount of an anhydrous aluminum halide to the reaction mixture of trichloroacetonitrile and hydrogen halides greatly activates the latter in causing trimerization of the trichloroacetonitrile, reducing the time required for completion of the reaction to only a few hours and in many cases to less than one hour. The aluminum halides alone, e. g. aluminum chloride or aluminum bromide, are substantially ineffective to cause the trimerization. In the method of the invention their function appears to be solely to serve as an activator for the hydrogen halide.

In carrying out the method of the invention the aluminum halide is dissolved in trichloroacetonitrile, and gaseous HCl or HBr is passed into the solution at about room temperature or below until the solution is saturated therewith. Considerable heat is evolved by the solution of the hydrogen halide in the liquid mixture, hence it may be necessary to cool the reaction vessel to control the temperature, which preferably should not be allowed to rise above 75° C., or 100° C. at most. The condensation of the trichloroacetonitrile proceeds spontaneously until the original liquid mixture solidifies, if at a temperature below the melting point of the trimer, indicating that the reaction is substantially complete.

The proportions of hydrogen halide and of aluminum halide, which are added to the trichloroacetonitrile, may be varied considerably. The proportion of hydrogen halide is not critical. A suitable amount is that required to saturate the liquid at a temperature between about room temperature and about −20° to −30° C., which is on the order of from 2 to 75 mols per 100 mols of the trichloroacetonitrile. However, a greater amount may be used, as desired, inasmuch as the acid is not consumed in the reaction and may be recovered from the reaction product with none except mechanical losses.

A closer control is to be given to the proportion of aluminum halide. As the proportion of aluminum halide in the reaction mixture is increased, the time of reaction is progressively shortened, but this gain in reaction rate is obtained at the expense of a gradual decrease in the yield of trimer. An optimum amount of aluminum halide, therefore, is preferably to be used, with which both a good yield of product and a short reaction time may be attained. In general, from 0.2 to 15.0 mols of aluminum halide per 100 mols of trichloroacetonitrile may be used, the optimum being about 1 to 2 mol per cent.

The advantages of the invention are attained in greatest measure when either the hydrogen halide or the aluminum halide used in the reaction, or both, is a bromide, as will appear from the following illustrative examples.

EXAMPLE 1

In a series of runs 5 cc. (7.15 grams) of $CCl_3CN$ was placed in a capsule made of heavy-walled glass pressure tubing, the amount of aluminum chloride shown in Table 1 was added, and the liquid was saturated with HCl at −40° C., except in the case of test No. 1, which was saturated at −30° C. The tubes were then sealed, and placed in a rotating apparatus in which they were rotated at room temperature until reaction was complete, as shown by solidification of the mixture. In Table 1 is shown the mol per cent of $AlCl_3$ added and the time for completion of the reaction in each case.

*Table 1*

| No. | Mol Per Cent AlCl₃ | Time |
|---|---|---|
| | | Hours |
| 1 | None | 95 |
| 2 | 0.37 | 24 |
| 3 | 9.1 | 20 |
| 4 | 11.9 | 4.5 |
| 5 | 15.3 | 3.5 |

In a comparative test using $AlCl_3$ alone without addition of HCl, there was no reaction in 100 hours.

EXAMPLE 2

In a steel bomb of 200 cc. capacity was placed 143 grams (0.99 mol) of dry $CCl_3CN$ and 10 grams (0.075 mol) of powdered $AlCl_3$. The bomb was connected to a cylinder of anhydrous HCl and the cylinder valve opened for 30 seconds, while cooling the bomb to absorb the heat of solution. The amount of HCl added was 27 grams (0.75 mol). The bomb was rotated for 5 hours with cooling to maintain the temperature below 75° C. At the end of the time the bomb was opened to release HCl gas. It was then heated to melt the solid contents, and the latter were discharged into one liter of water. The aqueous mixture was heated to remelt the solid product and stirred, to remove residual hydrogen chloride from the product. The mixture was then allowed to cool and the solid product was separated from the water. After air drying the product weighed 132 grams, corresponding to a yield of 92.5 per cent. The melting point was 90°–92° C. Upon recrystallizing from 95 per cent ethanol the melting point was 95°–96° C.

EXAMPLE 3

A series of runs was made as in Example 1, using various combinations of HCl or HBr with $AlCl_3$ or $AlBr_3$, as shown in Table 2. In each test the solution of aluminum halide ($AlX_3$) in trichloroacetonitrile was saturated with the hydrogen halide (HX) at 35° C. After charging the tubes were sealed and placed in a water bath at 25° C., being rotated until the contents had solidified to show completion of the reaction. Table 2 shows the hydrogen halide used, the mol per cent of $AlX_3$ added, the time of reaction, and the yield of trimer.

*Table 2*

| No. | HX | Mol Per Cent $AlX_3$ | Time | Per Cent Yield |
|---|---|---|---|---|
| 1 | HBr | None | 71 Hrs | 80.0 |
| 2 | HBr | 1.05 $AlBr_3$ | 1.8 Hrs | 93.0 |
| 3 | HBr | 2.14 $AlBr_3$ | 16 Min | 92.2 |
| 4 | HBr | 3.78 $AlBr_3$ | 19 Min | 90.0 |
| 5 | HBr | 5.98 $AlBr_3$ | 15 Min | 85.2 |
| 6 | HBr | 10.48 $AlBr_3$ | 3 Min | 79.4 |
| 7 | HBr | 0.82 $AlCl_3$ | 1.3 Hrs | 89.5 |
| 8 | HBr | 3.30 $AlCl_3$ | 8 Min | 79.9 |
| 9 | HBr | 7.18 $AlCl_3$ | 4 Min | 87.5 |
| 10 | HBr | 11.2 $AlCl_3$ | 30 Min | 81.0 |
| 11 | HCl | 1.12 $AlBr_3$ | 1.0 Hr | 93.7 |
| 12 | HCl | 2.23 $AlBr_3$ | 17 Min | 92.5 |
| 13 | HCl | 4.21 $AlBr_3$ | 20 Min | 90.0 |

A comparative test using $AlBr_3$ (2.0 mol %) alone without adding the hydrogen halide failed to give any reaction in 150 hours.

EXAMPLE 4

Into a 3 liter Erlenmeyer flask was placed 1430 grams (9.9 mols) of dry $CCl_3CN$ and 25 grams (0.094 mol) of $AlBr_3$, with warming to dissolve the $AlBr_3$ quickly. The solution was then saturated with dry HCl at 25° C. The flask was placed in a cold water bath, and the contents gradually increased in temperature to a maximum of 65° C. after 3.25 hours, at which time the mass solidified. Three-fourths of its volume of water was then added to the contents of the flask, which was heated to melt the solid product and then cooled to allow the product to solidify again. The water was decanted and the product was recrystallized from 95% ethanol. The yield of trimer was 95%, with a M. P. of 93°–95° C.

I claim:

1. The method of trimerizing trichloroacetonitrile which comprises adding to the same a hydrogen halide of the formula HX and from 0.2 to 15 mol per cent of an aluminum halide of the formula $AlX_3$, in which formulas X represents a halogen from the group consisting of chlorine and bromine, and maintaining the temperature of the mixture below 100° C. during the ensuing reaction.

2. The method of trimerizing trichloroacetonitrile which comprises adding to the same from 0.2 to 15 mol per cent of an aluminum halide having the formula $AlX_3$, saturating the mixture with a hydrogen halide having the formula HX, in which formulas X represents a halogen from the group consisting of chlorine and bromine, and maintaining the temperature of the mixture below 100° C. until reaction is complete.

3. The method of making 2,4,6-tristrichloromethyl-1,3,5-triazine which comprises dissolving in dry trichloroacetonitrile from 0.2 to 15 mol per cent of an aluminum halide from the group consisting of aluminum chloride and aluminum bromide, saturating the solution at a temperature between −40° C. and room temperature with a hydrogen halide from the group consisting of hydrogen chloride and hydrogen bromide, cooling the mixture while the reaction proceeds to maintain the temperature thereof below 75° C. until the mixture solidifies, and separating the product.

4. Method according to claim 3, in which at least one of the said halides is a bromide.

TED R. NORTON.

REFERENCES CITED

The following references are of record in the file of this patent:

UNITED STATES PATENTS

| Number | Name | Date |
|---|---|---|
| 1,989,042 | Kunz | Jan. 22, 1935 |

FOREIGN PATENTS

| Number | Country | Date |
|---|---|---|
| 682,391 | Germany | 1939 |
| 699,493 | Germany | 1940 |

OTHER REFERENCES

Thomas, Anhydrous Aluminum Chloride in Organic Chemistry, Reinhold Pub. Co., 1941, pp. 797 and 798.